(12) United States Patent
DeBoard et al.

(10) Patent No.: US 7,398,180 B2
(45) Date of Patent: Jul. 8, 2008

(54) VEHICLE TECHNICIAN TIME CLOCK TOOL

(75) Inventors: Tom D. DeBoard, Portland, OR (US); Paul Adams, Vancouver (CA); Frank Fox, Surrey (CA)

(73) Assignee: Daimler Trucks North America LLC, Portland, OR (US)

( * ) Notice: Subject to any disclaimer, the term of this patent is extended or adjusted under 35 U.S.C. 154(b) by 100 days.

(21) Appl. No.: 11/254,925

(22) Filed: Oct. 19, 2005

(65) Prior Publication Data
US 2006/0217856 A1    Sep. 28, 2006

Related U.S. Application Data

(60) Provisional application No. 60/620,382, filed on Oct. 19, 2004.

(51) Int. Cl.
G06F 19/00    (2006.01)
G06F 17/40    (2006.01)

(52) U.S. Cl. ............................... 702/178; 368/1; 368/9; 368/89; 368/107; 368/108; 368/243; 377/1; 377/13; 377/16; 702/176; 702/182; 702/7; 702/11; 702/32

(58) Field of Classification Search ............ 368/1, 368/9, 89, 107, 108, 109, 243, 244; 377/1, 377/13, 15, 16; 702/127, 176, 177, 178, 702/182; 705/7, 8, 9, 11, 32, 400
See application file for complete search history.

(56) References Cited

U.S. PATENT DOCUMENTS

| | | | | |
|---|---|---|---|---|
| 2,759,668 A | * | 8/1956 | Hielle .................... 235/61 R |
| 2,932,779 A | * | 4/1960 | Tancig ........................ 318/466 |
| 2,985,368 A | * | 5/1961 | Kohler et al. .................. 377/15 |
| 3,275,987 A | * | 9/1966 | Mann ..................... 340/825.69 |
| 3,321,704 A | * | 5/1967 | Mann .......................... 377/16 |
| 3,346,696 A | * | 10/1967 | Mann .................... 379/106.01 |
| 3,351,912 A | * | 11/1967 | Collom et al. .............. 711/157 |
| 3,372,379 A | * | 3/1968 | Collom et al. ................ 714/23 |
| 3,408,486 A | * | 10/1968 | Becker, Jr. .................... 377/15 |
| 3,482,083 A | * | 12/1969 | Warner ........................ 377/16 |
| 4,215,412 A | * | 7/1980 | Bernier et al. .............. 701/100 |
| 4,631,930 A | * | 12/1986 | Gutschmit et al. ............ 66/1 R |
| 5,212,635 A | * | 5/1993 | Ferriter ........................ 705/11 |
| 5,499,182 A | * | 3/1996 | Ousborne ..................... 701/35 |
| 5,657,233 A | * | 8/1997 | Cherrington et al. ........ 705/400 |
| 5,717,595 A | * | 2/1998 | Cherrington et al. ........ 705/400 |
| 6,070,155 A | * | 5/2000 | Cherrington et al. ........ 705/400 |
| 6,167,324 A | * | 12/2000 | Gorman ..................... 700/171 |
| 6,263,322 B1 | * | 7/2001 | Kirkevold et al. ........... 705/400 |

* cited by examiner

*Primary Examiner*—Edward R Cosimano
(74) *Attorney, Agent, or Firm*—Klarquist Sparkman LLP

(57) ABSTRACT

A vehicle technician time clock tool comprises a computer-implemented interface to a database, wherein the database contains vehicle service task-related information and time-related information, the vehicle service task-related information and time-related information pertaining to at least one vehicle technician, and a computer-implemented graphical user display (GUI), wherein the GUI displays in real time at least some of the vehicle service task-related information, at least some of the time-related information, and at least one calculation based on at least some of the time-related information.

20 Claims, 4 Drawing Sheets

300

THIS SCREEN SHOWS HOW YOU ARE PERFORMING

If your name is BLACK – you are on track for completing your job within time

If your name is RED then either:
- You have overshot the time allocated: SEE THE FOREMAN
- You do not have sufficient time allocated: SEE THE FOREMAN Once you have completed your Check and Advise
- Make sure that any further work done has new condition opened
- DO NOT DO REPAIR WORK ON A CHECK AND ADVISE...Get the Foreman to open a new repair condition Ask the Foreman for your target time and make sure your name stays BLACK

Figure 3

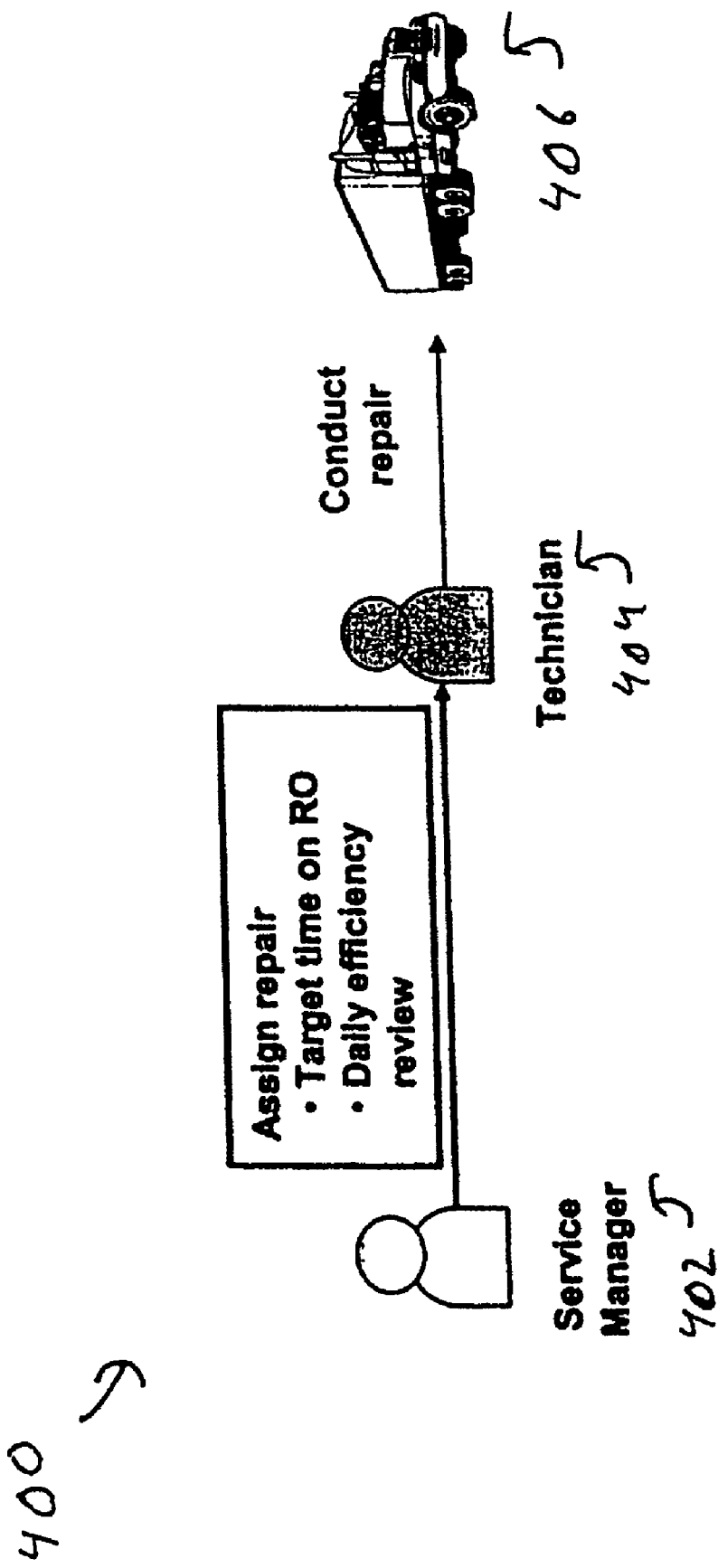

VEHICLE TECHNICIAN TIME CLOCK TOOL

CROSS-REFERENCE TO RELATED APPLICATION

This application claims the benefit of now expired U.S. Provisional Application No. 60/620,382, filed Oct. 19, 2004, which is hereby incorporated by reference.

TECHNICAL FIELD

This application relates to software applications used to track and perform calculations on time-related information for technicians in a vehicle repair facility.

BRIEF DESCRIPTION OF THE DRAWINGS

FIG. 3 is an illustration of an exemplary sign that can be posted next to a GUI such as the exemplary GUI illustrated in FIG. 2.

FIG. 4 illustrates an exemplary system in which target times are assigned to a technician.

DETAILED DESCRIPTION

Figure 1:
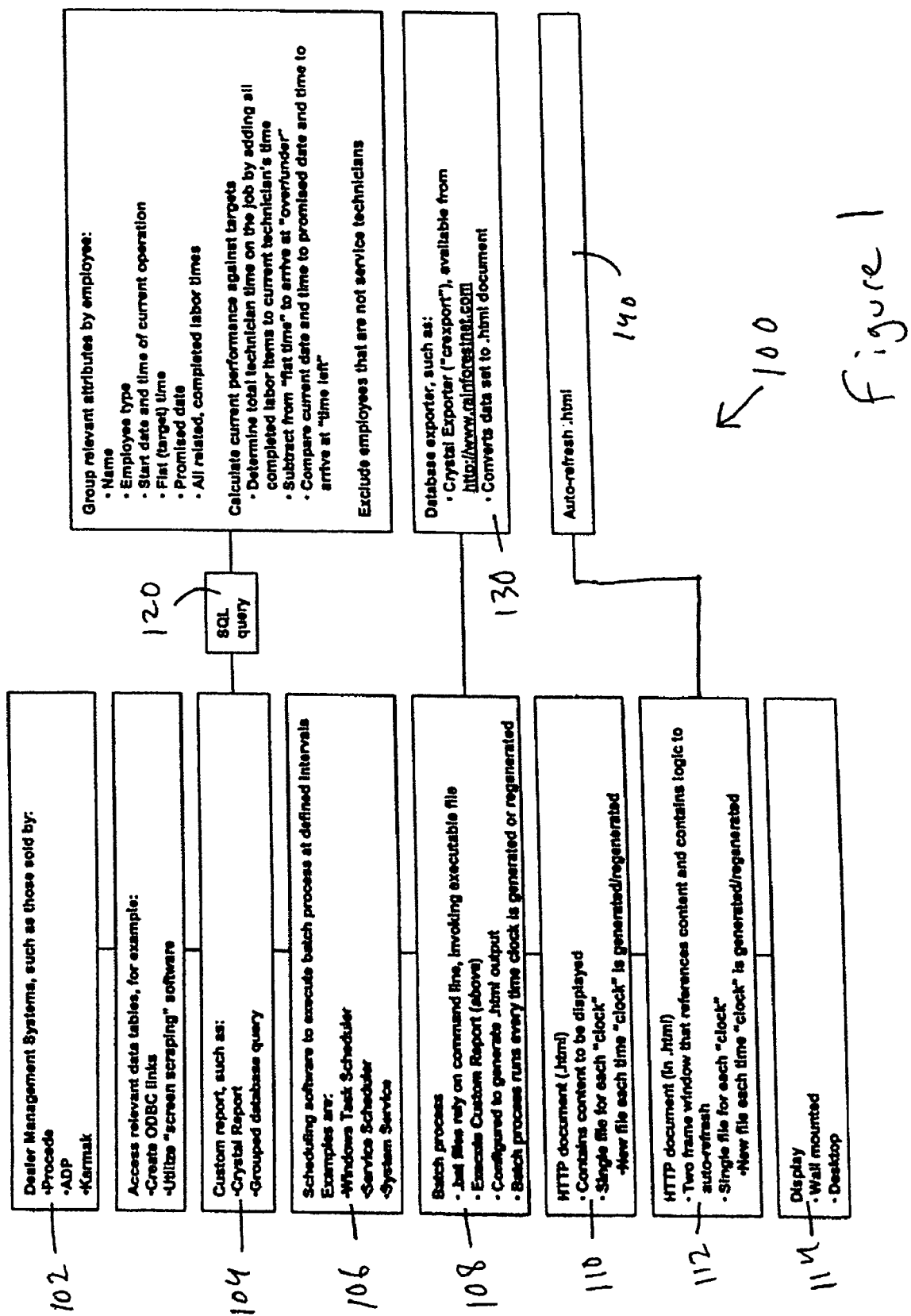
FIG. 1 is a block diagram illustrating an exemplary vehicle technician time clock tool.
Figure 2:
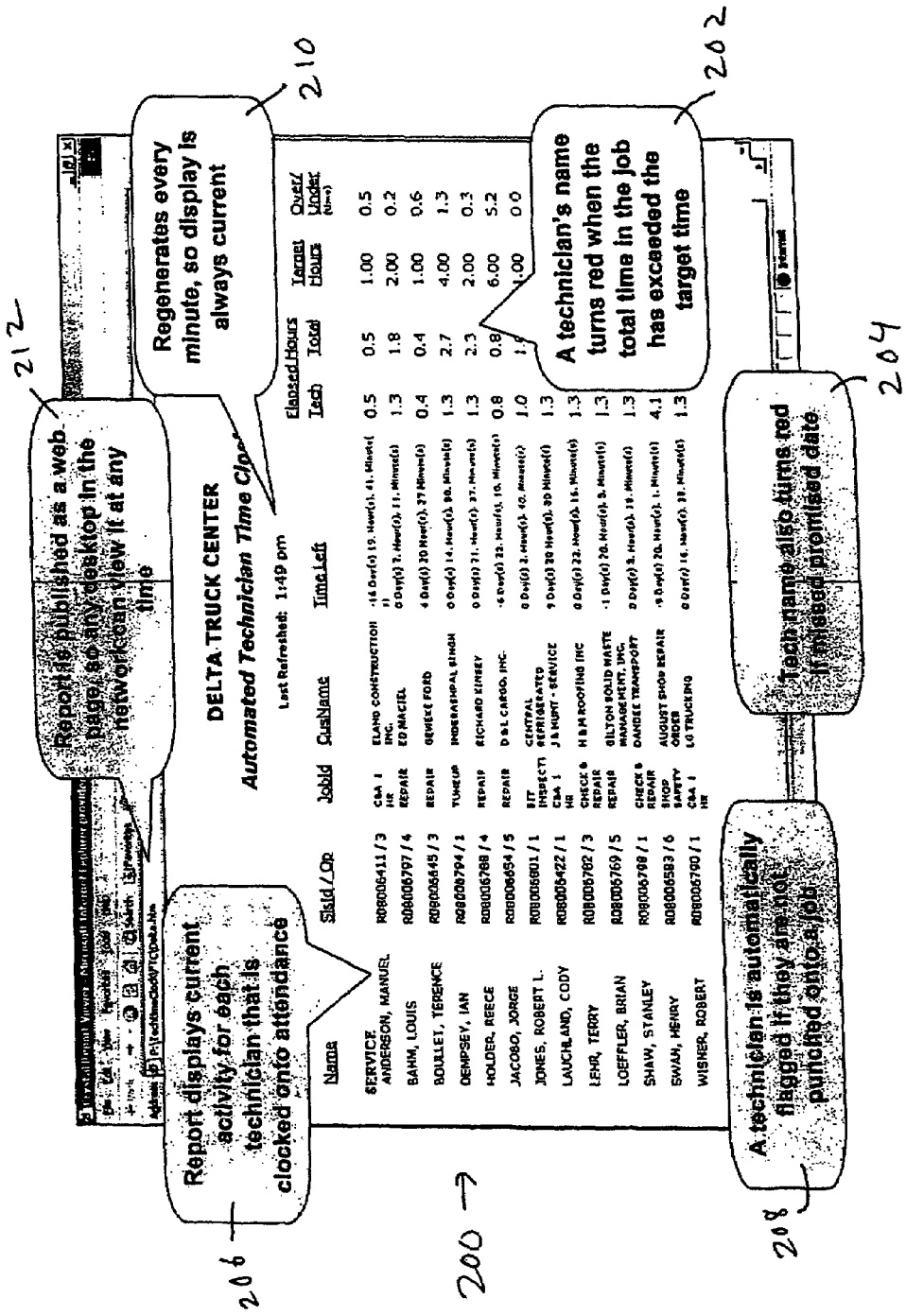
FIG. 2 is an illustration of an exemplary graphical user interface (GUI) that can provide report information.

FIG. 1 illustrates an exemplary dynamic vehicle technician time clock tool 100 that can provide information to an interface (e.g., the exemplary graphical user interface 200 illustrated in FIG. 2) such as technician name, service and operation identifier, job identifier, customer name, time left, elapsed technician time, elapsed total time, target time, and time over or under the target time. There can be visual indications of certain types of information. For example, when a technician is working on a specific service, the time left and/or over/under target time can be visually distinguished, such as changing the color of the displayed item if the category changes (e.g., going from under time to over time). For example, the time under/over can be displayed as black if positive and/or red if negative, as illustrated by the exemplary comments 202 and 204 in FIG. 2. Other categories or entire entries (e.g., for a specific technician or a specific service) can also be visually distinguished, such as being displayed in different colors to indicate whether a technician is over or under targeted time for a job.

In some situations, it is desirable for the displayed information to include information pertaining to current activity for each technician that is clocked onto attendance, as illustrated by the exemplary comment 206 in FIG. 2. It may also be desirable for the vehicle technician time clock tool to automatically flag a technician if he or she is not punched onto a job, as illustrated by the exemplary comment 208 in FIG. 2.

In some situations, it is desirable for the displayed information to be refreshed every five minutes. In other situations, it may be desirable for the refresh rate to be as small as one minute, as illustrated by the exemplary comment 210 in FIG. 2, or even smaller. In other situations, perhaps the refresh rate should be as large as ten minutes, or even larger. The refresh rate is generally variable and can be set or reset in various ways.

In one example, a dealer management system (e.g., the exemplary dealer management system 102 of FIG. 1) such as Procede can be used in connection with or as part of the vehicle technician time clock tool. A technician can log on to a time system at the beginning of the work day or shift and log off when leaving (e.g., lunch break or end of day/shift). The technician can also log on to a time system when beginning work on a specific job and log off when stopping (e.g., after finishing the job, taking a break, or working on something else). The two time systems may be separate systems or integrated as part of a single system.

In one example, the vehicle technician time clock tool involves creating ODBC links (e.g., to establish database connectivity to a database such as one that stores information relating to a technician's time at work or on a specific project). Screen scraping software can be used (e.g., to extract data from a file sent to be printed) to retrieve data to be used in computations.

In one example, a custom report (e.g., the exemplary custom report 104 of FIG. 1) can be used, such as Crystal Report. A SQL query (e.g., the exemplary SQL query 120 of FIG. 1) can be used to group certain attributes (e.g., by employee). For example, such attributes can include name, employee type, start date, time of current operation, flat time, and promised date. The custom report can calculate certain performance against target comparisons. For example, a technician's total time on a job can be determined by the addition of all completed labor items assigned to the technician's time. Also, an over/under time for a specific service/job can be determined by the subtraction of the total of all time spent by employees on the specific job from the flat (target) time for the specific job. The time left over for the specific job can be determined by comparing the target time with the total elapsed time for the specific job. Also, the time left over a promised time for completing all jobs to be done on a vehicle can be determined by comparing the current date/time to the promised date/time. In some situations, it may be desirable that only information pertaining to employees that are service technicians be involved in the calculations. In some situations, the report can be published as a web page, so any desktop in the network can view it at any time, as illustrated by the exemplary comment 212 in FIG. 2.

In one example, scheduling software (e.g., the exemplary scheduling software 106 of FIG. 1) can be used to execute one or more batch processes (e.g., a custom report) such as the exemplary batch process 108 of FIG. 1. A batch process can run at defined intervals (e.g., every time a clock is generated or regenerated). A batch process can invoke an executable file (e.g., at command line). A batch process can also be configured to generate HTML output. A database exporter (e.g., the exemplary database exporter 130 of FIG. 1) such as Crystal Exporter can be used to convert data set to an HTML document.

In one example, two HTTP documents (e.g., in .html), such as the exemplary HTTP documents 110 and 112 of FIG. 1, are used in the process. The first HTTP document may have a single file for each "clock" and a new file each time the "clock" is generated or regenerated. The second HTTP document may have a two-frame window, in which the first frame references content and the second frame contains logic to auto-refresh (e.g., the exemplary auto-refresh logic 140 of FIG. 1). For example, when certain activities take place (e.g., a new report is run) information from the first HTTP document may be transferred to the first frame of the second HTTP document so that the first HTTP document can now be used to store different (e.g., updated) information. The second frame of the second HTTP document can now process information from the first frame during a clock generation/regeneration.

An output display (e.g., the exemplary display 114 of FIG. 1) may be construed in various ways. For example, a display could be wall-mounted. Alternatively, it could be at a desktop.

FIG. 3 illustrates an exemplary sign 300 that can be posted next to a graphical user interface (GUI) such as the exemplary GUI 200 of FIG. 2. In one example, the sign 300 can provide to technicians information instructing how to understand what is being displayed by the GUI.

FIG. 4 illustrates an exemplary system 400 in which target times are assigned to a technician. A service manager 402 or foreman assigns a target time on an R/O to a technician 404 who is to conduct repair work on a particular vehicle 406. The service manager 402 or foreman knows when the technician 404 goes over the target time and can also perform daily efficiency reviews on the technician 404. Use of this system in conjunction with a vehicle technician time clock tool, such as the exemplary vehicle technician time clock tool 100 of FIG. 1, can lead to improved profitability and cycle times.

The vehicle technician time clock tool illustrated and described herein provides numerous advantages. For example, real-time proxy can be delivered for efficiency performance. Technicians can be encouraged to become involved in the management process (e.g., they can be driven to request target times). Target times can provide guidance to technicians where none currently exists (e.g., a technician who states "I thought I had ten hours for a clutch job.") Technicians that need a foreman's help can be identified. The act of going back to a customer to get approval for additional operations can be encouraged.

Having illustrated and described the principles of the invention by several embodiments, it should be apparent that those embodiments are illustrative only and should not be construed as limiting the scope of the present invention. The present invention encompasses all such embodiments as may come within the scope and spirit of the following claims and equivalents thereto.

We claim:

1. A vehicle technician time clock tool, comprising:
    a computer-implemented interface to a database, wherein the database contains vehicle service task-related information and time-related information, the vehicle service task-related information and time-related information pertaining to at least one vehicle technician; and
    a computer-implemented graphical user display (GUI), wherein the GUI displays in real time at least some of the vehicle service task-related information, at least some of the time-related information, and at least one calculation based on at least some of the time-related information at at least one point in time after the at least one vehicle technician has begun work on the vehicle service task and before the at least one vehicle technician has finished work on the vehicle service task.

2. The vehicle technician time clock tool of claim 1, wherein the vehicle service task-related information includes a first identifier corresponding to the vehicle technician, a second identifier corresponding to a customer, and a third identifier corresponding to a task assigned to the vehicle technician.

3. The vehicle technician time clock tool of claim 1, wherein the computer-implemented GUI is continually refreshed according to a refresh rate.

4. The vehicle technician time clock tool of claim 1, wherein the computer-implemented interface to the database includes ODBC links.

5. The vehicle technician time clock tool of claim 1, further comprising a computer-implemented interface to a dealer management system.

6. The vehicle technician time clock tool of claim 1, wherein the time-related information includes a first unit of time, the first unit of time corresponding to a target time to finish the assigned task.

7. The vehicle technician time clock tool of claim 6, wherein the time-related information includes a second unit of time, the second unit of time corresponding to how much time the vehicle technician has spent working on the assigned task.

8. The vehicle technician time clock tool of claim 7, wherein the time-related information includes a third unit of time, the third unit of time corresponding to the difference between the first unit of time and the second unit of time.

9. The vehicle technician time clock tool of claim 8, wherein the computer-implemented GUI displays the third unit of time as a first color when the third unit of time is positive, and wherein the computer-implemented GUI displays the third unit of time as a second color when the third unit of time is negative.

10. A computer-implemented method of monitoring vehicle technician time clock information, comprising:
    connecting to a database;
    extracting from the database data corresponding to time clock entries made by a vehicle technician, wherein the time clock entries pertain to a vehicle service task;
    performing at least one time-related calculation on at least some of the data extracted from the database after the vehicle technician has begun work on the vehicle service task and before the vehicle technician has completed the vehicle service task;
    displaying at least some of the data extracted from the database; and
    displaying at least one result from the at least one performed time-related calculation.

11. The computer-implemented method of claim 10, further comprising refreshing the displayed data and at least one result according to a variable refresh rate.

12. The computer-implemented method of claim 10, further comprising refreshing the displayed extracted data and the at least one displayed result, according to a variable refresh rate.

13. The computer-implemented method of claim 10, wherein the act of connecting to a database comprises creating ODBC links to the database.

14. The computer-implemented method of claim 10, wherein the act of performing at least one time-related calculation comprises determining a unit of time corresponding to how much time the vehicle technician has spent on a particular job.

15. The computer-implemented method of claim 10, wherein the act of performing at least one time-related calculation comprises determining a unit of time corresponding to how much time the vehicle technician has left on a particular job before exceeding a target time.

16. The computer-implemented method of claim 10, further comprising running a report against at least some of the database data corresponding to time clock entries made by the vehicle technician.

17. The computer-implemented method of claim 10, further comprising scheduling at least one batch process to run at a defined interval, wherein the batch process invokes an executable file.

18. A vehicle technician time clock tool system, comprising:
    a computer-implemented interface to a database containing data fields corresponding to technician name, service identifier, job identifier, customer name, time left, elapsed technician time, elapsed total time, target time, and over/under time;

a graphical display of the data fields, wherein display of the over/under time is a first color if the over/under time is positive and a second color if the over/under time is negative; and a reporting tool that calculates in real time at least one performance against target comparison.

19. The vehicle technician time clock tool system of claim 18, further comprising a scheduler that executes at least one batch process at a defined interval, wherein the batch process invokes an executable file and generates HTML output.

20. The vehicle technician time clock tool system of claim 18, wherein the first color is black and the second color is red.

* * * * *